United States Patent [19]
Zagoroff

[11] Patent Number: 5,197,315
[45] Date of Patent: Mar. 30, 1993

[54] AUTOMOBILE ANTI-THEFT DEVICE

[75] Inventor: Dimiter S. Zagoroff, Cambridge, Mass.

[73] Assignee: Steadfast Corporation, Chelsea, Mass.

[21] Appl. No.: 746,222

[22] Filed: Aug. 15, 1991

[51] Int. Cl.⁵ .............................................. E05B 17/00
[52] U.S. Cl. ........................................ 70/417; 70/237; 70/424; 74/493; 280/775; 403/116
[58] Field of Search ................. 70/18, 19, 202, 203, 70/209–212, 232, 237–239, 245, 247, 252, 416, 417, 422, 423, 424, 428; 403/116, 117; 74/493; 280/775

[56] References Cited

U.S. PATENT DOCUMENTS

| | | | |
|---|---|---|---|
| 2,959,168 | 11/1960 | Shook | 403/117 X |
| 3,193,999 | 7/1965 | Hester | 403/116 X |
| 3,811,303 | 5/1974 | Robertson | 70/237 |
| 3,916,658 | 11/1975 | Barry | 70/417 |
| 4,020,662 | 5/1977 | Fowler | 70/428 X |
| 4,134,279 | 1/1979 | Ross et al. | 70/424 X |
| 4,470,322 | 9/1984 | Beauch | 74/493 |
| 4,559,795 | 12/1985 | Zagoroff | 70/422 |
| 4,598,562 | 7/1986 | Freeman | 70/237 |
| 4,719,986 | 1/1988 | Richardson et al. | 70/417 X |
| 4,726,207 | 2/1988 | Gifford | 70/237 X |
| 4,955,215 | 9/1990 | Eremita | 70/417 X |

Primary Examiner—Renee S. Luebke
Assistant Examiner—Suzanne L. Dino
Attorney, Agent, or Firm—Cesari and McKenna

[57] ABSTRACT

The automobile anti-theft device consists of a hardened steel collar which encircles the steering column of the automobile and includes two rotatably attached sections which are attached to each other by sliding one end of a first section underneath an end of the second section. The first section has a projection on the end which fits into a radially extending recess on the underside of the second section and thus acts as a pivot point about which the first section rotates relative to the second section. The first section consists of an arcuate body, which is shaped to cover a portion of the side of the steering column, and a projection which extends radially out from the arcuate body. When this section is in place on the steering column, the projection is thus approximately perpendicular to the steering column. The second section consists of an arcuate body which is shaped to cover a portion of the steering column which is contiguous with and on the same side as the portion covered by the first section. The second section includes on its underside a recess which is shaped to receive the projection. When the collar is assembled around the steering column, the projection is disposed underneath the second section and extends into the recess to secure these two sections together to form the collar member. One of these sections then attaches to the other collar member, such that the collar encircles the steering column.

4 Claims, 3 Drawing Sheets

AUTOMOBILE ANTI-THEFT DEVICE

FIELD OF INVENTION

The invention relates generally to automobile anti-theft devices and more particularly to an anti-theft device for preventing unauthorized access to an automobile ignition switch and steering wheel lock through a steering column.

BACKGROUND

A thief can quickly steal an automobile by poking a hole through the plastic covering of the steering column and stripping a bolt which controls the ignition switch. The stripped bolt then slides into contact with and closes the switch, which starts the car. The bolt also controls the steering wheel lock, which consists of a rod which fits into a sprocket on the base of the steering wheel. The rod, when it is in place, prevents the sprocket from turning which, in turn, prevents the steering wheel from moving. When the bolt slides into contact with the ignition switch, it also loosens the rod. The rod may then slip or be pulled from the sprocket, which frees the steering wheel.

A previous invention assigned to the same assignee as the current invention is a hardened-steel collar which encircles the steering column. The collar substantially hinders unauthorized access to the ignition switch and steering wheel lock through the steering column, as discussed in U.S. Pat. No. 3 916 658. The steel collar consists of two collar members which are placed on either side of the steering column and secured to each other by pins forced into blind holes. One of the collar members includes an opening for insertion of an ignition key, which permits the automobile owner to operate the automobile with the collar in place.

To accommodate tilt, or adjustable, steering wheels, one or both of the collar members is essentially partitioned into two sections. One such device partitions only the collar member which covers the side of the steering column through which a thief can most easily gain access to the mechanism that actuates the ignition switch and lock. These two sections attach to each other such that they can rotate relative to one another as the steering column moves to adjust the tilt, or angle, of the steering wheel. One of these sections also attaches to the other half of the sleeve to form the portion of the sleeve which encircles the steering column.

Desirably, the two sections which form the two-section collar member join together in a manner which keeps them relatively close together throughout the adjustment range of the steering column. Otherwise, a thief may gain access to the switch and lock mechanism through gaps between the two sections.

FIG. 1 illustrates the prior anti-theft device 10 for use with an automobile with an adjustable steering column 12. The device 10, which is a hardened-steel collar, consists of a first collar member 14, which includes an opening 16 and rotatable cover 18 through which an ignition key may be inserted, and a second collar member 15 which is divided into two sections 20 and 22. Pins 17 fasten section 20 to the first collar member 14, to form the portion of the collar which encircles the steering column 12.

Section 20 includes at one end a tab 19. The tab 19 includes a circular slot (not shown) that is used in securing together the sections 20 and 22. Section 22 has a first end 23a which slides into a crevice between the steering column 12 and the dashboard 13 and a second end 23b into which the tab 19 fits. The second end includes an attached band 24 which, together with a surface of the second end 23b, forms a space, or gap, into which the tab 19 slides. The second end 23b and the band 24 each contain circular slots which align with the circular slot in tab 19. A one-way screw 26 runs through the aligned circular slots to secure together the sections 20 and 22. Whenever an adjustment to the steering column 12 is made, the sections 20 and 22 rotate relative to one another around the screw 26, as necessary.

By encircling the steering column with a hardened-steel collar, this anti-theft device deters thieves from gaining access to the mechanism which activates the ignition switch and the steering wheel lock. Further, it accommodates adjustments to the steering column. I have developed an improvement to this device which operates in basically the same manner, but is less expensive to manufacture and easier to assemble. This improvement also narrows the gap between the sections of the device which rotate relative to one another.

SUMMARY

The inventive automobile anti-theft device, or collar, which is made of hardened steel and encircles the steering column of the automobile, includes two sections which rotate relative to one another and are attached to each other by sliding one end of a first section underneath an end of the second section. The first section has a projection on the end which fits into a radially extending recess on the underside of the second section and thus acts as a pivot point about which the first section rotates relative to the second section.

The first section consists of an arcuate body, which is shaped to cover a portion of the side of the steering column, and a projection which extends radially out from the arcuate body. When this section is in place on the steering column, the projection is thus approximately perpendicular to the steering column.

The second section consists of an arcuate body which is shaped to cover a portion of the steering column which is contiguous with and on the same side as the portion covered by the first section. The second section includes on its underside a recess which is shaped to receive the projection.

When the collar is assembled around the steering column, the projection is disposed underneath the second section and extends into the recess to secure these two sections together to form the collar member. One of these sections then attaches to the other collar member, such that the collar encircles the steering column. Thereafter the second section rotates relative to the first section, as necessary to accommodate adjustments of the steering column, by essentially adjusting the position of the projection in the recess.

These two sections need not be fastened together with, for example, a screw, because the projection-recess arrangement restricts the movement of the projection and prevents the sections from separating. Thus the assembly of the device is simplified. Also, less material is required to form the projection and recess and the sections are more easily fabricated.

DETAILED DESCRIPTION

Figure 1:
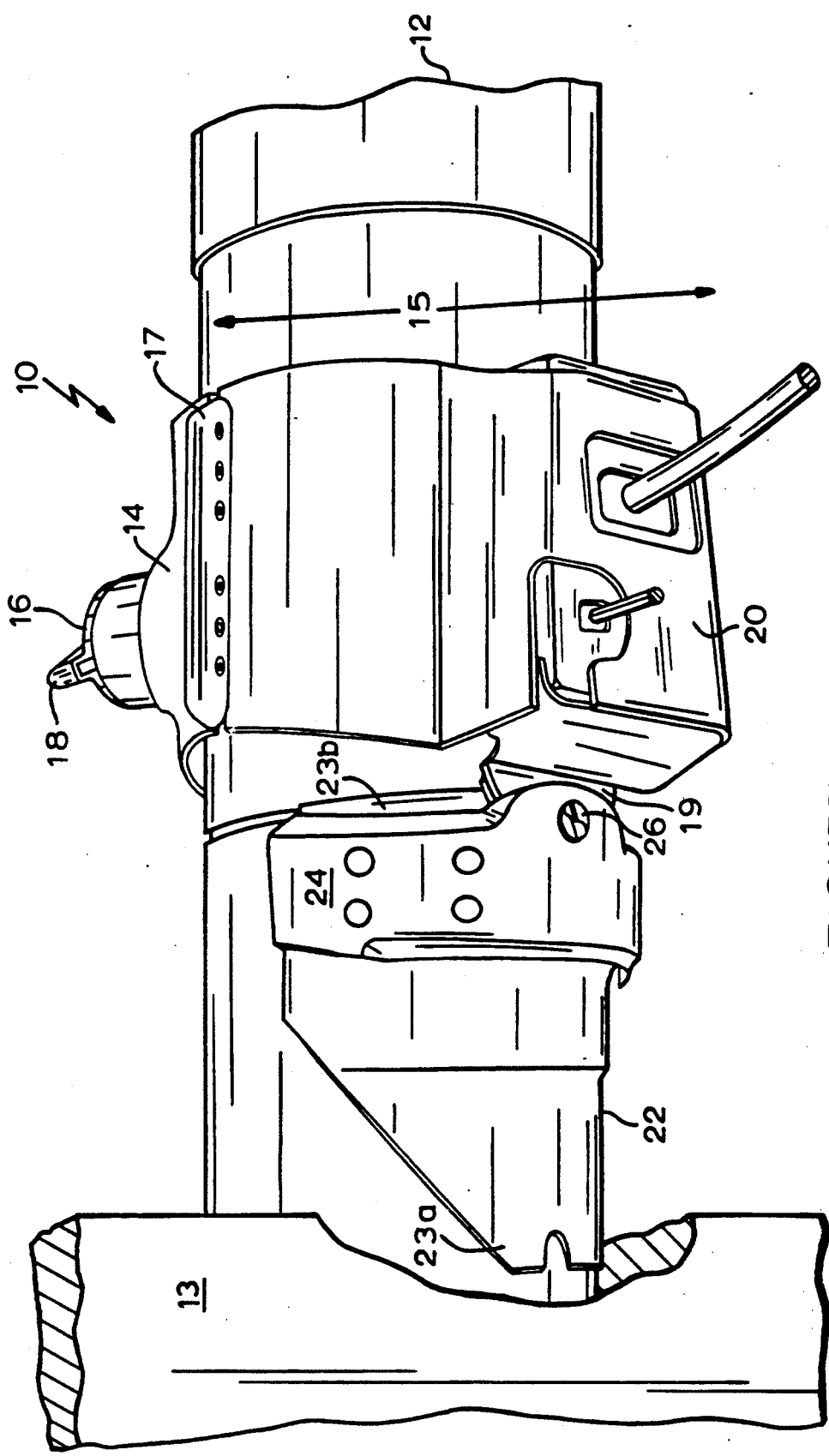
FIG. 1 is an illustration of applicant's prior automobile anti-theft device.
Figure 2:
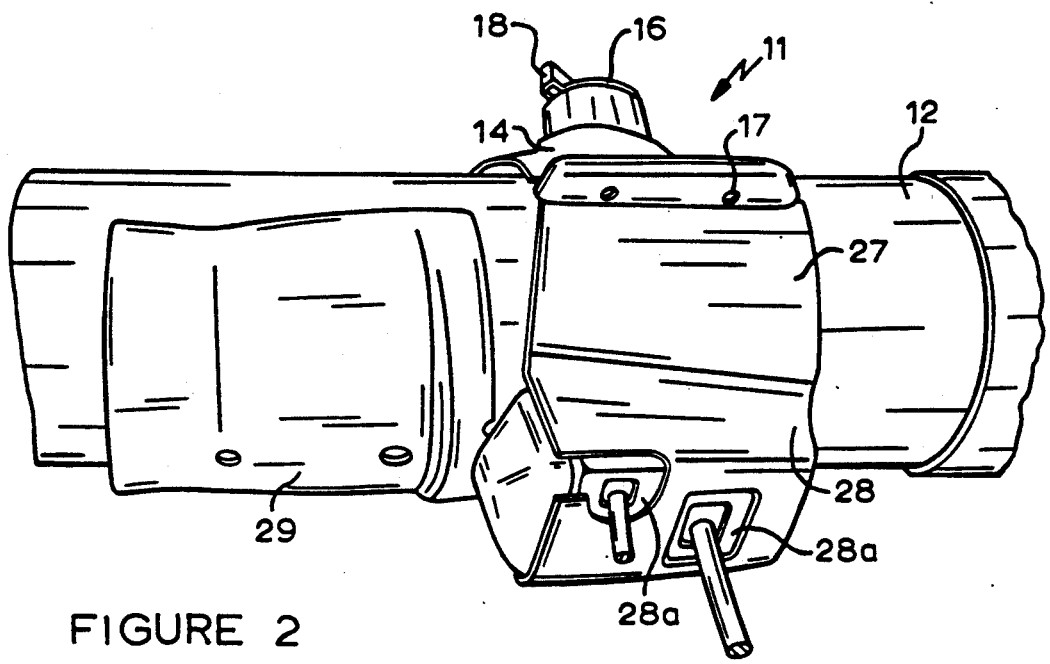
FIG. 2 is an illustration of a fully assembled automobile anti-theft device constructed in accordance with the current invention.
Figure 3:
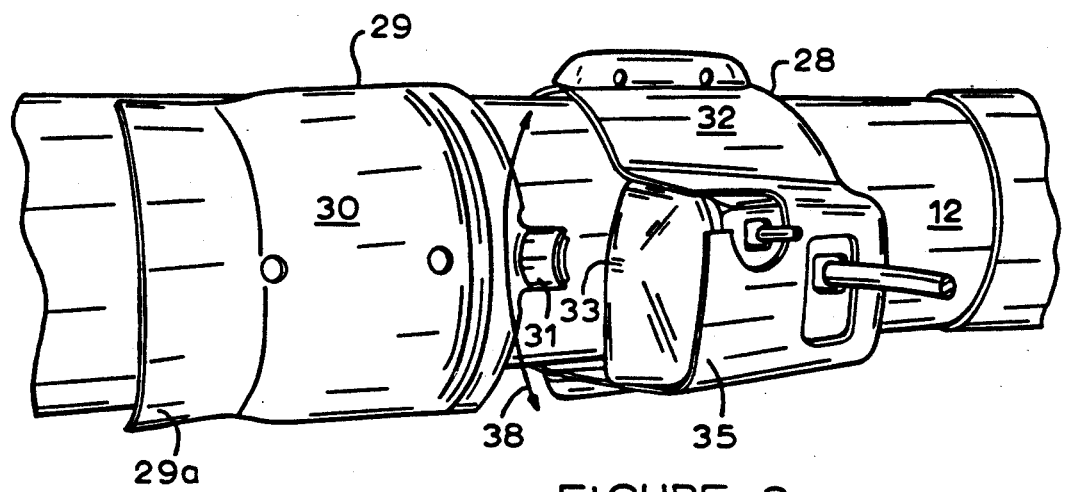
FIG. 3 is an illustration of the automobile anti-theft device of FIG. 2 with first and second sections of the device disconnected.

FIGS. 2 and 3 illustrate an automobile anti-theft device 11 which is constructed in accordance with the invention. The device, or collar, 11 covers the exterior of automobile steering column 12 with hardened steel. The collar 11 includes a first collar member 14, which is the same as the first collar member 14 of FIG. 1. The first collar member 14 includes an opening 16 and a rotatable cover 18 which are, in the preferred embodiment, constructed in accordance with the system disclosed in U.S. Pat. No. 4,559,795, which is assigned to the same assignee as the current invention. A second collar member 27 consists of two sections 28 and 29 which rotate relative to one another to accommodate an adjustable steering column.

Section 28 includes various cut-outs 28a for directional controls, window wiper controls, and so forth. This section 28 attaches to the first collar member 14 to form the portion of the collar 11 which encircles the steering column. It, also, attaches to section 29 to form the adjustable portion of the collar.

Section 29 consists of an arcuate body 30 and a projection 31. The projection 31 extends radially out from the arcuate body such that it is essentially perpendicular to the steering column when the section is in place on the column. Section 28 consists of an arcuate body 32 and a recess 33. The recess 33 is shaped to receive the projection, as shown in more detail in FIG. 4. Sections 28 and 29 attach to each other simply by inserting the projection into the recess 33. The projection moves within the recess 33, as necessary, to rotate section 29 relative to section 28, as explained in more detail below.

The projection 31 includes an elongated end 32, which in the preferred embodiment is slightly curved. The opposite end of projection is secured to one of the surfaces of the arcuate body 33. In the preferred embodiment, this end is welded to the bottom surface of the arcuate body, that is, the surface which rests against the steering column. The projection 31 is formed using reinforced, or two-ply steel.

Figure 4:
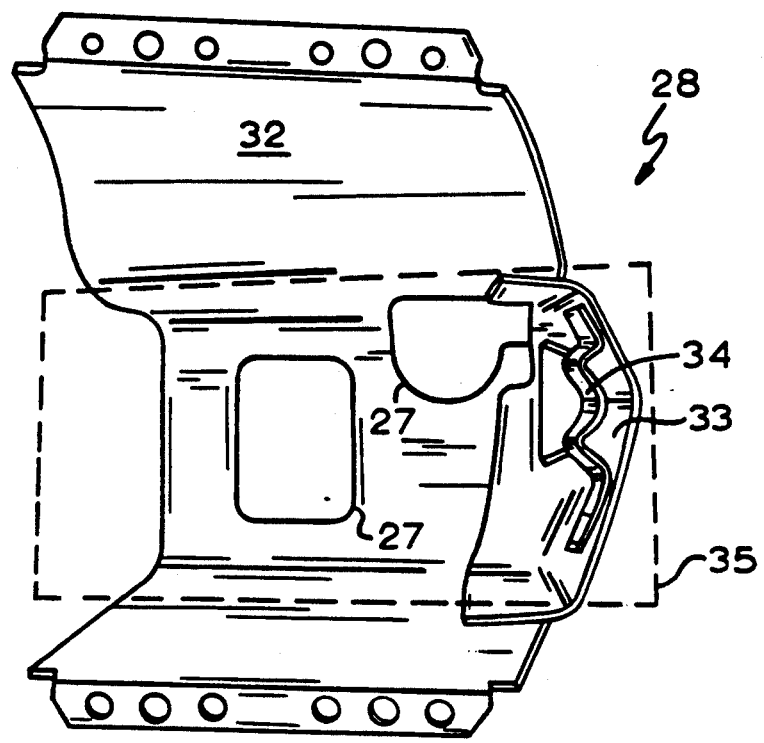
FIG. 4 is an illustration of the automobile anti-theft device of FIG. 2 showing the second section retainer recess for receiving the projection of the first section.

As shown in FIG. 4, section 28 consists of the arcuate body 32, which is shaped to rest against the steering column, and a shaped retainer 34. The arcuate body 32 fits on the portion of the steering column 12 which is enlarged to include controls for the directionals, the windshield wipers, and so forth. Accordingly, the arcuate body 32 includes a raised section 35, which has an end wall 36.

The retainer 34, which is shaped to match the curve of the projection 31 (FIG. 3), attaches to the inner surface of the end wall 36 to form the recess 33. In the preferred embodiment, the end wall 36 is shaped to correspond to the curve of the retainer 34, and thus, the curve of the projection 31.

When the projection is in place in recess 33, it slides from the top of the recess to the bottom of the recess and back, as depicted by arrow 38 (FIG. 3), to accommodate an upward or downward adjustment of the steering column 12. As the projection 31 slides in recess 33, sections 28 and 29 rotate relative to one another, to match the movement of the steering column. Accordingly, recess 33 must be long enough to enable the two sections 28 and 29 to rotate through the full adjustment range of the steering column.

The two sections 28 and 29 remain relatively close to each other throughout this full range of movement. Accordingly, any gap which results from the movement is minimal, which substantially hinders a thief's attempts to gain unauthorized access to the ignition switch through the steering column.

The device 11 is relatively easy to assemble. Section 29 is positioned on the steering column 12 by sliding an end 29a into a crevice between the steering column and the dashboard. The projection 31 then extends radially out from the steering column. Next section 29 is placed on the steering column such that the recess 33 fits over the projection. These two sections are thus secured to each other to form collar member 27. Next, the other collar member 14 is placed in position on the steering column and secured to section 28 using pins 17. The pins 17 are pushed into blind holes such that they can not be removed from the holes without being drilled out. The device 11 thus does not require a screw to attach sections 28 and 29 to each other, as is required to attach to each other corresponding sections 20 and 22 of the previous device 10 shown in FIG. 1.

The assembly of device 11, and in particular the assembly of section 29, is simplified because of the projection-recess arrangement. The sections 28 and 29, which include the projection and the recess 33, are less expensive to fabricate than the corresponding sections of the prior device.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An automobile anti-theft device for covering a steering column which includes an enlarged portion incorporating controls levers for the operation of devices such as directional signals, the automobile anti-theft device comprising:

A. a first member shaped to cover a portion of the steering column;

B. a second member for connecting to the first member to form a collar which encircles the steering column, the second member including a first section and a second section— i. the first section including an arcuate body shaped to fit a portion of the steering column on a side opposite the first member and a projection connected to the arcuate body, the projection extending radially out from the arcuate body;

ii. the second section including a body shaped to fit a portion of the steering column which is opposite the first member and contiguous to the portion of the steering column which the first section covers, the body including— i. a raised section shaped to fit the enlarged portion of the steering column and having apertures that accommodate the controls, the raised section including an end wall, the end wall being positioned to enclose and end surface of the enlarged column portion and having an inner surface which faces the enlarged portion and an outer surface which faces away from the enlarged portion; and ii. a retainer, the retainer being attached to the inner surface of the end wall, and with said end wall forming a recess shaped to receive the projection;

the first section and the second section connecting together to form the second member by positioning the recess relative to the projection, such that the first section and the second section may rotate relative to one another to accommodate movement of the steering column, the second member connecting to the first member by securing the second section to the first member.

2. The anti-theft device of claim 1, wherein the first member includes a raised section shaped to cover the portion of the steering column which encloses an ignition lock, the raised section including a hole for insertion of a key into the ignition lock.

3. The anti-theft device of claim 1, wherein the projection is an arcuate tab.

4. The anti-theft device of claim 3, wherein the end wall and the retainer form an arcuate recess within which the projection moves to accommodate movement of the steering column.

* * * * *